Dec. 9, 1947.    J. C. BARTHO .    2,432,369
STEERING MECHANISM FOR AUTOMOBILES
Filed Sept. 17, 1946    4 Sheets-Sheet 1
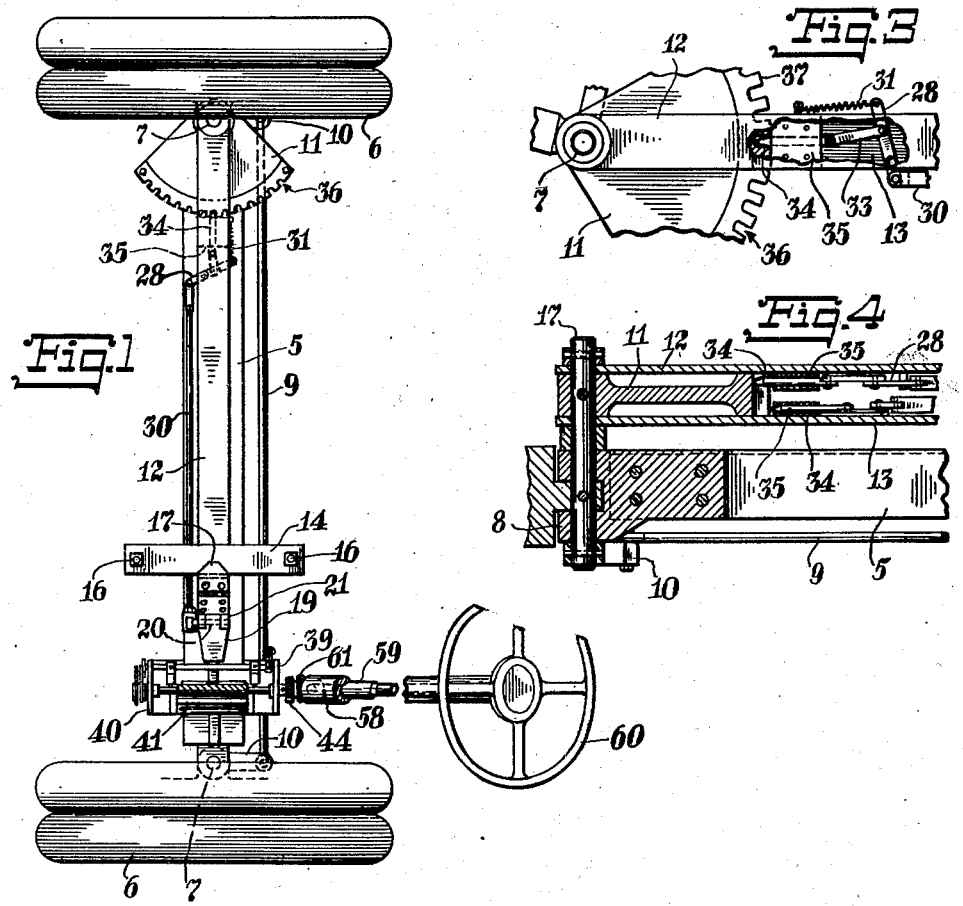
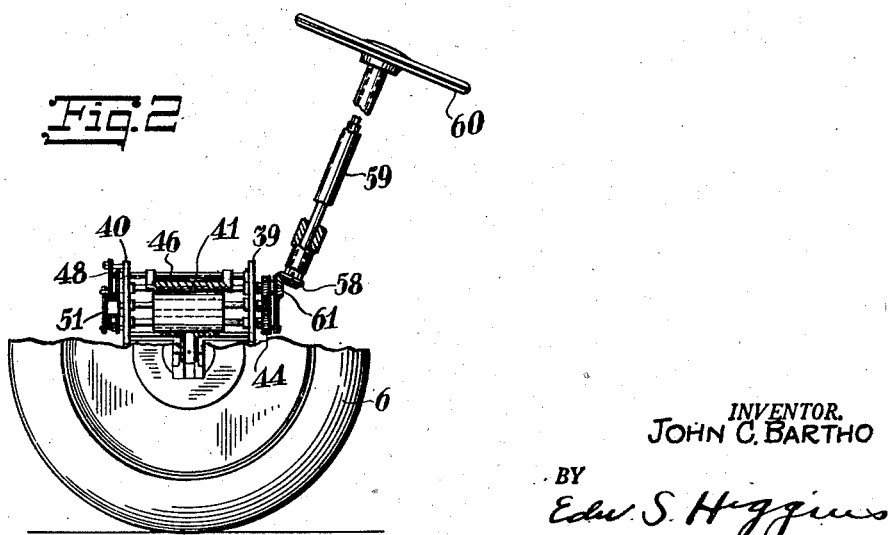
INVENTOR.
JOHN C. BARTHO
BY
Edw. S. Higgins
Atty Dec. 9, 1947.  J. C. BARTHO  2,432,369
STEERING MECHANISM FOR AUTOMOBILES
Filed Sept. 17, 1946  4 Sheets-Sheet 2
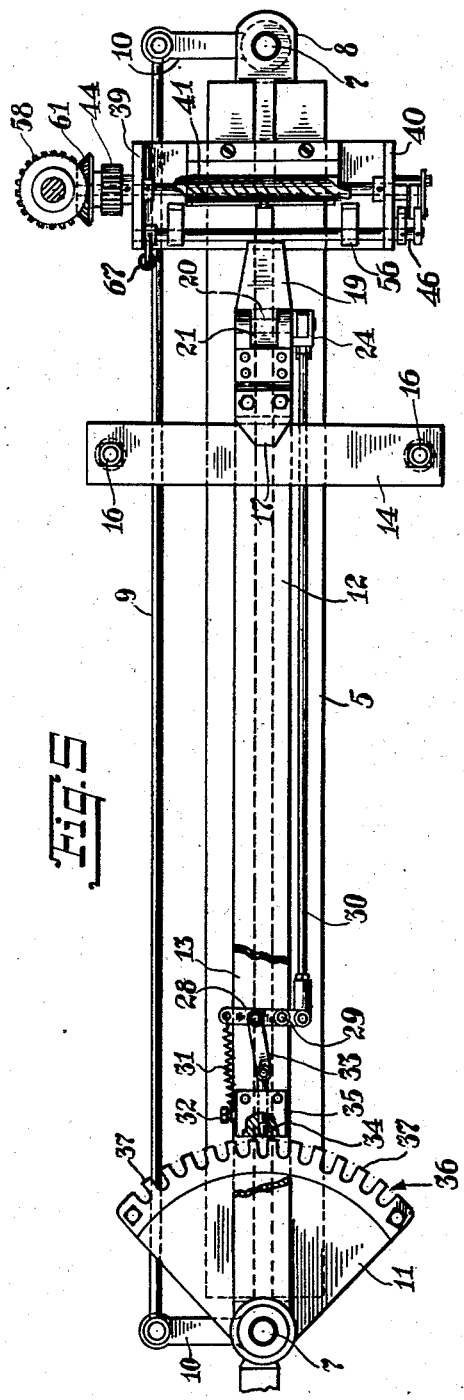
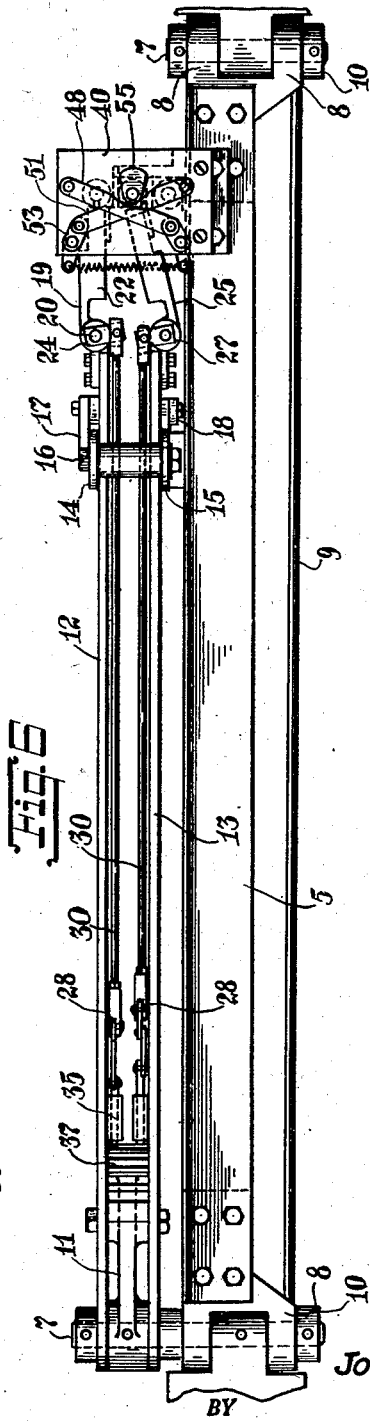
INVENTOR.
JOHN C. BARTHO

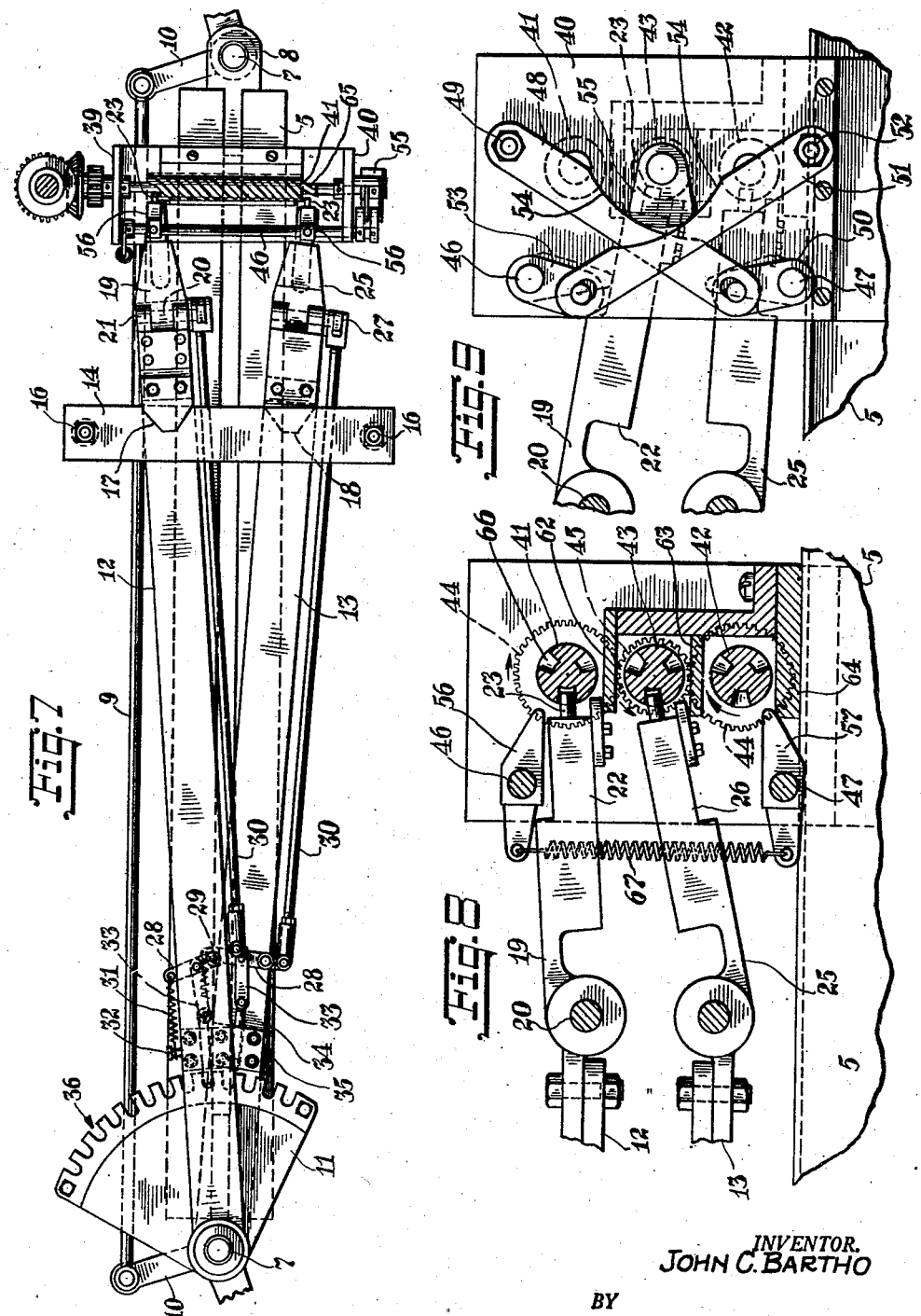

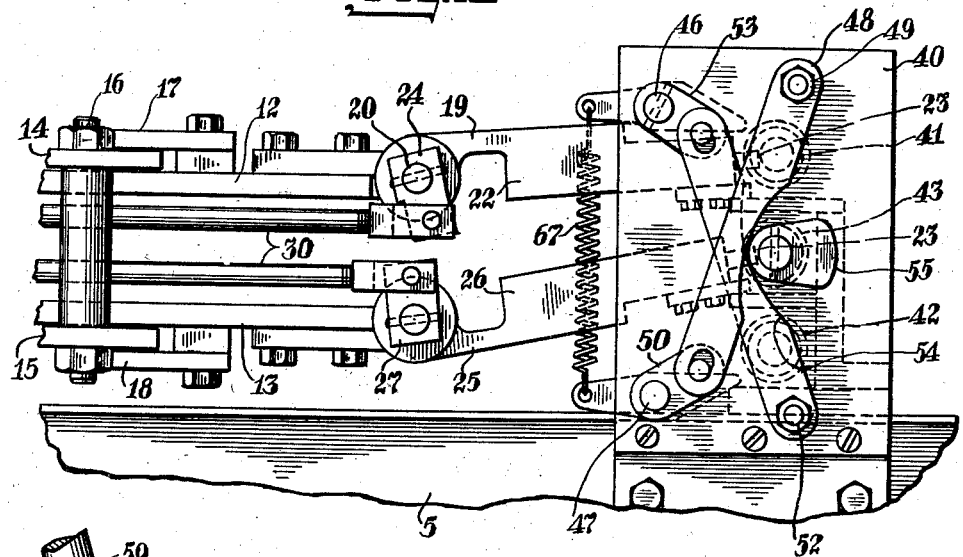
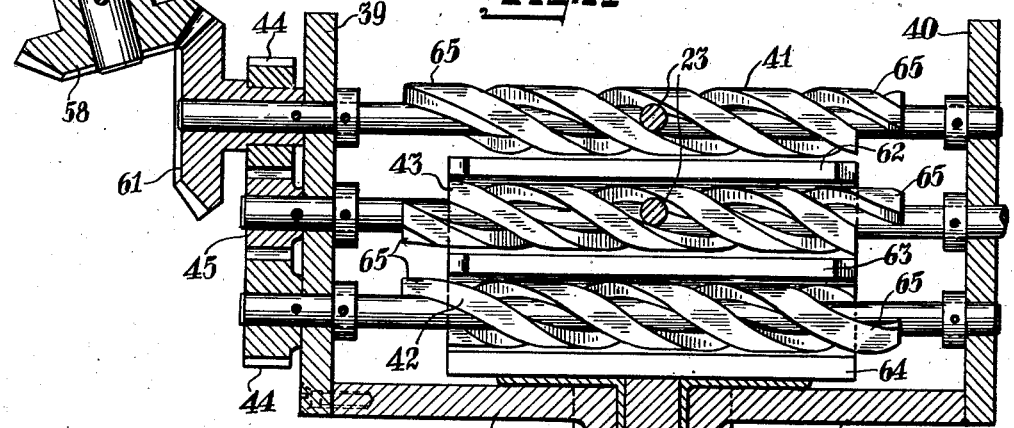
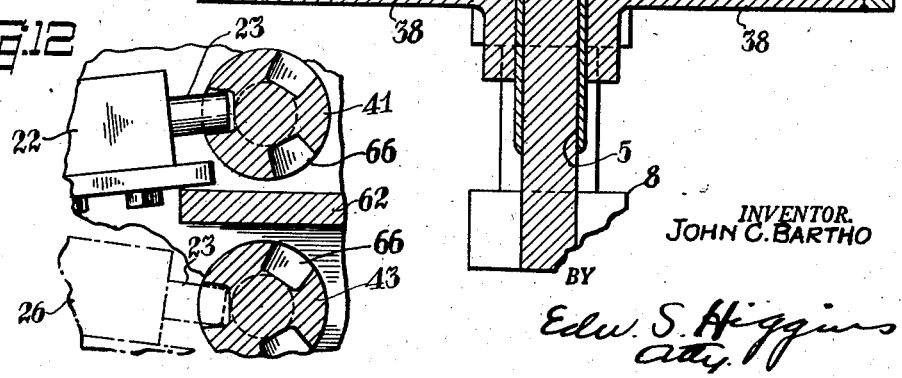

Patented Dec. 9, 1947

2,432,369

UNITED STATES PATENT OFFICE 2,432,369

STEERING MECHANISM FOR AUTOMOBILES

John C. Bartho, New York, N. Y., assignor of one-half to John Haranis, Astoria, Long Island, N. Y.

Application September 17, 1946, Serial No. 697,398

14 Claims. (Cl. 280—96)

1

This invention relates particularly to steering mechanism for automobiles.

Commercial trucks and passenger automobiles of today are made so large and heavy that it is only with great muscular effort that the front steering wheels are able to be turned especially if the vehicle is standing still or is mired in mud or the like.

Furthermore because of the great manual strength necessary for steering such vehicles, manufacturers of automobiles have found it impractical to mount heavy wheels or more than a single wheel at each end of the front axle and as a result it was necessary to carefully limit the load on said front or steering wheels.

According to the present invention wheels of any desired size or of any number may be mounted on the front axle because manual strength as a factor in steering is reduced to a minimum. Furthermore the pay load may be distributed over the entire length of the automobile thereby permitting larger and heavier loads to be carried and thereby eliminating the necessity of trailers with extra wheels for taking up the load and thereby shortening the overall length of the vehicle with consequent saving in storage and parking space etc.

A prime object of the invention is to provide mechanism for exerting a powerful leverage on the front road steering wheels.

Another object is to provide mechanism for steering automobiles that is easy to manipulate and is positive in action.

A further object is to provide steering mechanism that is inexpensive to manufacture and that can be adapted to any standard type of front wheel mounting.

Other objects and advantages of my invention will be apparent from the description thereof to follow taken in connection with the accompanying drawings in which—

Fig. 1 is a top plan view of the front part of an automobile showing the mounting of the front road wheels and steering mechanism embodying my invention.

Fig. 2 is a fragmentary side elevational view showing the improved steering mechanism.

Fig. 3 is an enlarged fragmentary view showing in detail the connection between one of the steering levers and the gear segment.

Fig. 4 is a side view of the mechanism of Fig. 3.

Fig. 5 is an enlarged top plan view showing the improved steering mechanism, parts being broken away.

2

Fig. 6 is a side view of the mechanism shown in Fig. 5.

Fig. 7 is a view similar to Fig. 5 but showing the steering levers in moved positions.

Fig. 8 is an enlarged sectional view showing in detail the connection between the ends of the steering levers and the two uppermost rotating worm members.

Fig. 9 is an enlarged fragmentary view showing in detail the mechanism for rocking the shafts for shifting the levers up and down and showing the levers connected to the two lowermost rotating worm members.

Fig. 10 is a view similar to Fig. 9 but showing the levers connected to the two uppermost rotating worm members.

Fig. 11 is an enlarged sectional view showing in detail the ends of the levers in the grooves of the rotating worm members.

Fig. 12 is a fragmentary sectional view through the worms.

The improved steering mechanism is shown as mounted on the upper surface of a conventional front axle 5 of an automobile. The front road wheels 6 are mounted on the usual knuckle or king pins 7 supported by the usual knuckles 8. A tie rod 9 extending between the knuckle arms 10 connects the front road wheels in the usual manner.

A gear segment 11 is fastened to the king pin on one end of the axle at a point about midway the length of said pin. A flat lever bar 12 has one end pivotally secured to the same king pin above but adjacent to the gear segment so that its under surface is adjacent to the upper surface of the gear segment. Another similar lever bar 13 also has one end pivotally secured to the king pin adjacent to but below the gear segment so that its upper surface is adjacent to the lower surface of the gear segment. The bars 12 and 13 extend along the front axle and are guided in their movements by a frame supported on the axle and comprising an upper cross rail 14 and a lower cross rail 15 fastened together at their ends by bolts 16. A plate member 17 secured to the bar 12 adjacent its free end coacts with the upper rail 14 for guiding said bar; and a similar plate 18 on the lower surface of lever bar 13 coacts with the lower rail 15 for guiding said bar 13 in its movement.

On the extreme free end of the upper lever bar 12 is a nose member 19. This nose member is fastened to a stub shaft 20 which is pivotally mounted in the bifurcated end 21 of the lever bar. The nose member consists of a tapered body portion with a neck portion 22, square in cross section, protruding from beneath the narrow end of the body and with a round pin 23 extending from the end of the neck portion. Secured to one of the outer ends of the stub shaft 20 is a downwardly extending lug 24.

On the extreme free end of the lower lever bar 13 is a pivoted nose member 25 similar in construction to the nose member 19 on the upper lever bar. The neck portion 26 of nose member 25 however protrudes from above the body portion and the lug 27 on the outer end of the stub shaft extends upwardly.

A link member 28 is pivotally mounted at 29 on the underside of the upper lever bar 12 adjacent the pivoted end thereof and pivotally connected to one end of this link member is one end of an elongated rod 30 which extends along the bar 12 to the nose end thereof where it is pivotally connected to the downwardly extending lug 24 on the stub shaft 20. Link member 28 extends across the lever bar 12 and fastened to its opposite end is one end of a helical spring 31, the other end of the spring being fastened to a pin 32 on the bar 12. Another link member 33 has one end pivotally fastened to the link member 28 midway the length of said link 28 and extends rearwardly and carries a bolt 34 adapted to be moved through an opening in a guide plate 35 on the underside of the bar 12 into and out of one of the slots 36 between the teeth 37 of the gear segment, to thereby lock the upper lever bar 12 to the gear segment 11. The spring 31 normally urges the link member 28 and link member 33 rearwardly for moving the bolt 34 into one of the slots 36 of the gear segment whereby the lever bar 12 becomes interlocked with the gear segment for moving said segment.

Similar link members 28 and 33, spring 31 and bolt 34 are similarly mounted on the upper surface of the lower lever bar 13 for interlocking said lower lever bar with the gear segment whereby the gear segment will be moved by said lower lever bar. The rods 30 connect the ends of the link members 28 on the upper and lower lever bars with the lugs 24 and 27, respectively, on the nose members of the lever bars.

The mechanism for moving the lever bars 12 and 13 is mounted on the end of the axle opposite the gear segment and comprises a frame including horizontally disposed rails or plates 38 secured to the axle and side plates or walls 39 and 40 at the outer ends of said rails. Journalled in the side walls are the shafts of an upper worm member 41, a lower worm member 42 and an intermediate or neutral worm member 43, said worm members being disposed in vertical alignment. The worm shafts extend outwardly through the side wall 39 and mounted on the extended ends of each of the shafts mounting worm members 41 and 42 is a gear 44 of similar size, and mounted on the shaft mounting the intermediate gear member 43 is a gear of smaller size, the three gears being in continuous mesh whereby when movement is imparted to one of said gears, for example, the gear on the shaft mounting the upper worm member 41, as shown in the drawings, all three of the worm members rotate simultaneously and in unison. However when the upper and lower worm members rotate in one direction for example clockwise as shown in Fig. 8, the intermediate or neutral worm member 43 rotates in the opposite direction or counterclockwise, and vice versa, as will be understood. The intermediate worm member 43 will also rotate at a greater speed than the other two worm members which rotate at the same speed.

Rockably mounted between the side walls 39 and 40 at the top thereof is a shaft 46 and at their bottom is another shaft 47. These shafts extend outwardly through the side wall 40. A lever 48 has one end pivotally connected to a stud 49 extending outwardly of the wall 40 adjacent its top edge and has its other end loosely connected through a slot and stud connection with an arm 50 fastened to the protruding end of the bottom shaft 47. A similar lever 51 has one of its ends pivotally connected to a similar stud 52 extending outwardly from wall 40 adjacent its bottom edge and has its other end loosely connected to an arm 53 fastened to the protruding end of the upper shaft 46. Each of the levers 48 and 51 is provided with a curved cam face 54 along one edge thereof substantially midway its length. The lever 48 is disposed outside of lever 51.

The shaft mounting the intermediate worm member 43 protrudes outside of the side wall 40 and fastened to said protruding end is a broad faced cam member 55 so disposed that when moved it wipes along the curved surfaces 54 on the edges of the levers 48 and 51 whereby said levers are moved, which movement is transmitted to the shafts 46 and 47 through the arms 50 and 53, respectively. Fastened on each end of the upper shaft 46 is a lug member 56 and on each end of the lower shaft 47 a similar lug member 57.

Movement or drive is brought to the gears on the shafts of the worm members by a pinion 58 fastened to the bottom end of the steering post 59 of the steering wheel 60, said pinion being in mesh with a pinion 61 on the outermost end of the shaft of worm member 41. It will be understood of course that the pinion 61 may be mounted on the shaft of the lower worm member or on the shaft of the intermediate worm member if desired, and that instead of manual movement by means of the steering wheel, the shaft of either worm member may be operatively connected to mechanism actuated by an electric motor or by an air turbine.

Disposed between the upper worm member 41 and the intermediate worm member 43 is a guide rail 62 which extends slightly beyond said worm members in a horizontal plane, and between the lower worm member 42 and said intermediate worm member is another guide rail 63 similarly disposed. Another guide rail 64 is disposed below the lower worm member. The guide rails 62 and 63 are not as long as the bodies of the upper and intermediate worm members, the ends of said rails terminating short of the ends of said worm members. However one thread of each worm member extends beyond the other threads on each side of its shaft as indicated at 65.

In operation, the protruding pin 23 of one of the lever bars, for example the upper lever bar 12, is positioned in one of the grooves 66 between the threads of one of the worm members, for example, the upper worm member 41, as shown in Fig. 8. The protruding pin 23 of the other lever bar, for example, the lower lever bar 13 is positioned in one of the grooves between the threads of the intermediate or neutral worm member 43.

When the steering wheel 60 is turned for steering the vehicle, its movement is carried by the steering post 59 and pinion 58 to the pinion 61 on gear 44 on the shaft of the upper worm member 41 as shown in the drawings. Movement is thus imparted to all of the worm members through the intermeshing gears. Pin 23 of the upper lever bar in the groove of the upper worm member is moved by the walls of the groove to the right, for example, as viewed in Fig. 11, carrying the lever bar 12 along with it. The spring 31 on the other end of the lever bar 12 has drawn the bolt 34 of the link 33 into engagement with one of the slots 36 between the teeth of the gear segment thereby interlocking said lever 12 and the gear segment whereby said gear segment is moved by said upper lever bar in the same direction with it, for example to the right, and thereby moving the road wheels 6, to the right.

In positioning the protruding pin 23 of the lower lever bar 13 in the intermediate worm member 43, the nose member 25 thereof was pivotally moved upwardly whereby said nose member pulled rod 30 toward the nose member of said lower lever bar against the action of spiral spring 31 on said lower level bar thereby pulling the protruding bolt 34 of said lower bar out of the slot of the gear segment and unlocking said gear segment and said lower lever bar so that movement of the lower lever bar cannot be imparted to the gear segment. Therefore when the pin 23 of the upper lever bar is moving to the right for example as aforesaid, the pin 23 of the lower lever bar in the groove of the intermediate worm member 43 is moving to the left and while thus moving to the left the lower lever bar is doing no work as the bolt 34 has been moved out of engagement with the gear segment. When the pin 23 of the upper lever bar has traveled about to the right hand end of the worm member 41, the pin 23 of the lower lever bar traveling in the intermediate worm member 43 will have reached the end of its travel to the left hand end of said intermediate worm member because said intermediate member rotates faster than the upper worm member. When the nose member 25 of said lower lever with its pin 23 and neck portion 26 thus reaches the end of its leftward travel and moves out of engagement with the walls of the groove of the worm member, the pin and neck portion are clear of the guide rail 63 and the spring 31 on the other end of said lower lever bar will move said nose member 25 downwardly by means of the link members 28 and 33 and rod 30. When the nose member 25 of said lower lever bar is thus moved downwardly, it is moved into alignment with the lower worm member 42, and at the same time the spring 31 pulls the bolt 34 on the link 33 on the lower lever bar into one of the slots 36 of the gear segment thus interlocking the gear segment and said lower lever bar together. Further movement of the pin 23 of the upper lever bar member 12 to the right will move the pin 23 of the lower lever bar into operative engagement with the thread extension 65 on the lower worm member 42 bringing the neck portion 26 of the nose member on the lower lever bar between and into interlocking position between the guide rail 63 and the lower guide rail 64. At the instant that the pin 23 of the lower lever bar is thus moved into operative engagement with the threads on the lower worm member 42, the pin 23 and the neck portion 22 of the nose member on the upper lever bar 12 will have cleared the right hand end of the upper worm member and the guide rail 62 and will become positioned directly underneath the lug 56 on the right hand end of the rockable shaft 46. At this same instant, the cam 55 on the shaft of the intermediate worm member will have been rotated and moved into engagement with the curved surfaces 54 of the levers 48 and 51 thereby moving said levers and rocking the upper shaft 46 with its lug 56 whereby said lug strikes the pin 23 on the upper lever bar and thus moves the nose member of said upper lever bar downwardly into alignment with the threads on the intermediate worm member 43. This downward movement the nose portion on the upper lever bar will move the rod 30 connected thereto whereby the link members 28 and 33 are moved to pull the bolt 34 out of engagement with the gear segment. Continued movement of the steering wheel 60 in the same direction will then move the pin 23 on the lower lever bar 13 to the right along the lower worm member 42 and thus carry the lower lever bar to the right and thus continue the movement of the gear segment to the right thereby continuing the movement of the road wheels in the same direction. The pin 23 of the upper lever 12, during this movement of the lower lever bar to the right, will be moving to the left in the intermediate worm member 43 and inasmuch as the bolt 34 of said upper lever bar is out of engagement with the gear segment, said upper lever bar is doing no work. Thus the intermediate worm member is a neutral member. When the pin 23 of the nose member of the lower lever bar has about reached the end of its travel to the right hand end of the lower worm member 43, the pin 23 of the nose member of the upper lever bar will have reached the end of its travel to the left of the intermediate worm member 43. When said pin 23 and neck portion 22 of the nose member of the upper lever bar have thus reached the end of their travel to the left and the neck portion is free of the guide rail 62, the spiral spring 31 on the other end of the upper lever bar will move the nose portion of said upper lever bar upwardly into alignment with the grooves of the upper worm member 41. Further movement of the pin 23 of the nose member of the lower lever bar to the right will then move the pin 23 of said upper lever bar into operative engagement with the extension thread 65 of said upper worm member and bring the neck portion 22 of said upper bar into locking position between the guide rail 62 and the upper rockable bar 46. Simultaneously with the positioning of the pin 23 of the upper lever bar into engagement with the threads of the upper worm member, the pin and neck portion of the nose member of the lower lever bar will have moved clear of the right hand end of the rail 62 into alignment with the lug on the lower rockable shaft 47. At the same time, the cam 55 on the shaft of the central worm member has turned around into engagement with the curved surfaces 54 of the levers 48 and 51 thereby moving said levers and rocking the lower rockable shaft 47 whereby the lug 57 engages the pin 23 of the nose portion of the lower lever bar which lifts said nose member with its pin 23 upwardly into alignment with the threads on the intermediate worm member. Movement of the nose member of the lower lever bar upwardly will move the rod 30 thereby rocking the link members 28 and 33 on the lower lever bar and thereby pulling the bolt 34 of said bar out of engagement with the slot in the gear segment against the action of spring 31 so that the lower lever bar can do no work while its pin 23 is moving in the groove of the intermediate worm member.

The rockable shafts 46 and 47 with their lugs 56 and 57, respectively, are returned to normal position after the cam 55 moves away from the surfaces 54 of the lever 48 and 51 by a compression spring 67 which has one end secured to the lug 56 of upper shaft 46 and its other end secured to the lug 57 of the lower shaft 47.

The pin members 23 of the upper and lower lever bars thus move back and forth in the grooves of the worm members, the pin in the upper and lower worm members moving in one direction while the pin in the intermediate worm member moves in the opposite direction. The bolt 34 of either the upper or the lower worm member is always interlocked with the gear segment. The lever bars when connected with the upper and lower worm members will always move in the same direction. For example, when the steering wheel is turned to the right, the pin in the grooves of the upper worm member or the pin in the groove of the lower worm member will move to the right, while the pin in the intermediate worm member will move to the left. There is thus a continuous movement to the right of the pins in the upper and lower worm members. Similarly, when the steering wheel is turned to the left, there is a continuous movement of said pins with their lever bars to the left.

It will thus be seen that when the pin member of the nose member of one lever bar has finished its travel along either the upper or lower worm member, the pin member of the nose member of the other bar is in the intermediate or neutral worm member and is carried along said neutral worm member to be in a position ready to be moved into either the upper or lower worm member for movement by said latter member, and when said latter lever bar is moved to operative connection with either said upper or lower worm member, the first-named lever bar is moved to inoperative position in the neutral worm member so that there is always one lever bar in operative connection with the gear segment, and the other lever bar is always out of operative connection therewith.

By reason of the present construction, a small movement of the steering wheel will exert a great leverage on the front road wheels whereby steering of such road wheels even under very heavy loads is facilitated.

I claim:

1. In steering mechanism for automobiles, in combination, a steering wheel, a plurality of worm members operatively connected to said steering wheel for rotation thereby, a gear segment, a pair of pivoted levers having their ends selectively and detachably connected to said worm members and to said gear segment and front steering wheels operatively connected to said gear segment.

2. In steering mechanism for automobiles, in combination, a steering wheel, upper, lower and intermediate worm members operatively connected to said steering wheel for rotation thereby, said upper and lower worm members being rotatable in the same direction and at the same speed and said intermediate worm member being rotatable in an opposite direction and at a greater speed than the other worm members, a gear segment, a pair of pivoted levers disposed between said worm members and said gear segment, means for selectively and detachably engaging the ends of said levers with at least two of said worm members, means for selectively and detachably connecting the ends of said levers with said gear segment and front steering wheels operatively connected to said gear segment.

3. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers disposed on different levels and between said worm members and said gear segment, means for selectively and detachably connecting one end of the upper one of said levers with the upper worm member or the intermediate worm member, means for selectively and detachably connecting one end of the lower lever with the lower worm member or the intermediate worm member, means for selectively connecting the opposite ends of said levers with said gear segment for moving the latter and front steering wheels operatively connected to said gear segment.

4. In steering mechanism for automobiles, in combination, a steering wheel, upper, lower and intermediate worm members operatively connected to said steering wheel for rotation thereby, said upper and lower worm members being rotatable in the same direction and at the same speed and said intermediate worm member being rotatable in an opposite direction and at a greater speed than the other worm members, a gear segment, a pair of pivoted levers disposed between said worm members and said gear segment, each of said levers having a pivoted nose portion at one end thereof adapted to be detachably and selectively connected to one of said worm members, means for detachably and selectively connecting the other ends of said levers to said gear segment and front steering wheels operatively connected to said gear segment.

5. In steering mechanism for automobiles, in combination, a steering wheel, upper, lower and intermediate worm members operatively connected to said steering wheel for rotation thereby, said upper and lower worm members being rotatable in the same direction and at the same speed and said intermediate worm member being rotatable in an opposite direction and at a greater speed than the other worm members, a gear segment, a pair of pivoted levers disposed between said worm members and said gear segment, means for selectively and detachably engaging the ends of said levers with at least two of said worm members, a spring-pressed pin carried on the opposite end of each of said levers adapted to be interlocked with said gear segment and front steering wheels operatively connected to said gear segment.

6. In steering mechanism for automobiles, in combination, a steering wheel, upper, lower and intermediate worm members operatively connected to said steering wheel for rotation thereby, said upper and lower worm members being rotatable in the same direction and at the same speed and said intermediate worm member being rotatable in an opposite direction and at a greater speed than the other worm members, a gear segment, a pair of pivoted levers disposed between said worm members and said gear segment, each of said levers having a pivoted nose portion at one end thereof adapted to be detachably and selectively connected to one of said worm members, a spring-pressed pin carried on the opposite end of each of said levers adapted to be interlocked with said gear segment and front steering wheels operatively connected to said gear segment.

7. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers, the individual levers of said pair being disposed on different levels, a pivoted nose portion on one end of the upper lever, a pin carried by said nose portion adapted to ride in the groove in the upper worm member and in the groove in the intermediate worm member, a pivoted nose portion on one end of the lower lever, a pin carried by said latter nose portion adapted to ride in the groove in the lower worm member and in the groove in the intermediate worm member, means for selectively and detachably connecting the opposite ends of said levers with said gear segment for moving the latter and front steering wheels operatively connected to said gear segment.

8. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers, the individual levers of said pair being disposed on different levels, a pivoted nose portion on one end of the upper lever, a pin carried by said nose portion adapted to ride in the groove in the upper worm member and in the groove in the intermediate worm member, a pivoted nose portion on one end of the lower lever, a pin carried by said latter nose portion adapted to ride in the groove in the lower worm member and in the groove in the intermediate worm member, means for moving each of said nose portions from the groove in one of the worm members to the groove in the adjacent worm member, means for detachably and selectively connecting the opposite ends of said levers with said gear segment for moving the latter and front steering wheels operatively connected to said gear segment.

9. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers, the individual levers of said pair being disposed on different levels, a pivoted nose portion on one end of the upper lever, a pin carried by said nose portion adapted to ride in the groove in the upper worm member and in the groove in the intermediate worm member, a pivoted nose portion on one end of the lower lever, a pin carried by said latter nose portion adapted to ride in the groove in the lower worm member and in the groove in the intermediate worm member, rockable shafts disposed adjacent to and operatively connected to said rotatable worm members, lugs carried by said shafts and adapted to engage the nose portions of the levers for moving said nose portions from one worm member to the adjacent worm member, means for detachably and selectively connecting the opposite ends of said levers with said gear segment for moving the latter and front steering wheels operatively connected to said gear segment.

10. In steering mechanism for automobiles, in combination, a steering wheel, upper, lower and intermediate worm members operatively connected to said steering wheel for rotation thereby, said upper and lower worm members being rotatable in the same direction and at the same speed and said intermediate worm member being rotatable in an opposite direction and at a greater speed than the other worm members, a gear segment, a pair of pivoted levers disposed between said worm members and said gear segment, each of said levers having a pivoted nose portion at one end thereof adapted to be detachably and selectively connected to one of said worm members, a spring-pressed pin carried on the opposite end of each of said levers adapted to be interlocked with said gear segment, a rod for operatively connecting the nose portion and spring-pressed pin of each lever and front steering wheels operatively connected to said gear segment.

11. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers, the individual levers of said pair being disposed on different levels, a pivoted nose portion on one end of the upper lever, a pin carried by said nose portion adapted to ride in the groove in the upper worm member and in the groove in the intermediate worm member, a pivoted nose portion on one end of the lower lever, a pin carried by said latter nose portion adapted to ride in the groove in the lower worm member and in the groove in the intermediate worm member, a link member pivotally connected to the other end of each lever, a pin carried by each link member adapted to interlock with the gear segment for connecting the lever with the gear segment, and front steering wheels operatively connected to said gear segment.

12. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers, the individual levers of said pair being disposed on different levels, a pivoted nose portion on one end of the upper lever, a pin carried by said nose portion adapted to ride in the groove in the upper worm member and in the groove in the intermediate worm member, a pivoted nose portion on one end of the lower lever, a pin carried by said latter nose portion adapted to ride in the groove in the lower worm member and in the groove in the intermediate worm member, a link member pivotally connected to the other end of each lever, a pin carried by each link member adapted to interlock with the gear segment for connecting the lever with said gear segment, a rod for operatively connecting the nose portion and the link member of each lever and front steering wheels operatively connected to said gear segment.

13. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers, the individual levers of said pair being disposed on different levels, a pivoted nose portion on one end of the upper lever, a pin carried by said nose portion adapted to ride in the groove in the upper worm member and in the groove in the intermediate worm member, a pivoted nose portion on one end of the lower lever, a pin carried by said latter nose portion adapted to ride in the groove in the lower worm member and in the groove in the intermediate worm member, means for moving each of said nose portions from the groove in one worm member to the groove in the adjacent worm member, a link member pivotally connected to the other end of each lever, a pin carried by each link member adapted to interlock with the gear segment for connecting the lever with said gear segment, a rod for operatively connecting the nose portion and the link member of each lever and front steering wheels operatively connected to said gear segment.

14. In steering mechanism for automobiles, in combination, a steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted levers, the individual levers of said pair being disposed on different levels, a pivoted nose portion on one end of the upper lever, a pin carried by said nose portion adapted to ride in the groove in the upper worm member and in the groove in the intermediate worm member, a pivoted nose portion on one end of the lower lever, a pin carried by said latter nose portion adapted to ride in the groove in the lower worm member and in the groove in the intermediate worm member, rockable shafts disposed adjacent to and operatively connected to said rotatable worm members, lugs carried by said shafts and adapted to engage the nose portions of the levers for moving said nose portions from one worm member to the adjacent worm member, a link member pivotally connected to the other end of each lever, a pin carried by each link member adapted to interlock with the gear segment for connecting the lever with said gear segment, a rod for operatively connecting the nose portion and the link member of each lever and front road steering wheels operatively connected to said gear segment.

JOHN C. BARTHO.

REFERENCES CITED

The following references are of record in the file of this patent:

UNITED STATES PATENTS

| Number | Name | Date |
|--------|------|------|
| 733,084 | Schultz | July 7, 1903 |
| 1,476,068 | Froelich | Dec. 4, 1923 |